(12) United States Patent
Kuriki et al.

(10) Patent No.: US 7,150,267 B2
(45) Date of Patent: Dec. 19, 2006

(54) INTAKE PORT STRUCTURE FOR INTERNAL COMBUSTION ENGINE

(75) Inventors: Hiroshi Kuriki, Atsugi (JP); Nobuyuki Tokuou, Yokohama (JP); Hidefumi Komuro, Setagaya-ku (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/008,661

(22) Filed: Dec. 10, 2004

(65) Prior Publication Data
US 2005/0139195 A1    Jun. 30, 2005

(30) Foreign Application Priority Data
Dec. 25, 2003   (JP)   ............................. 2003-429598

(51) Int. Cl.
*F02B 15/00*   (2006.01)
*F02B 3/00*    (2006.01)

(52) U.S. Cl. ..................................... 123/432; 123/302

(58) Field of Classification Search ................ 123/308, 123/432, 302
See application file for complete search history.

(56) References Cited

U.S. PATENT DOCUMENTS

| | | | | |
|---|---|---|---|---|
| 4,770,139 A | * | 9/1988 | Tanaka ........................ | 123/308 |
| 4,805,569 A | * | 2/1989 | Suzumura et al. .......... | 123/308 |
| 5,295,464 A | * | 3/1994 | Ando et al. .................. | 123/308 |
| 5,417,190 A | * | 5/1995 | Ando et al. .................. | 123/308 |
| 5,423,300 A | * | 6/1995 | Ando et al. .................. | 123/432 |

FOREIGN PATENT DOCUMENTS

JP    H05-321678    12/1993

* cited by examiner

*Primary Examiner*—John T. Kwon
(74) *Attorney, Agent, or Firm*—Global IP Counselors, LLP (57) ABSTRACT

An intake port structure includes a collector passageway disposed in an upstream section and the first and second branching passageways disposed in a downstream section that branch from the collector passageway. The intake port structure further includes an intake air flow impact section formed on a crotch portion between first and second branching passageways against which a portion of an intake air flow from the collector passageway collides such that the portion of the intake air flow is dispersed laterally toward both sides of the intake air flow impact section. The intake air flow impact section is recessed to stem portions of intake valves, and includes first and second impact surfaces. The second impact surface is formed along the stem portions of the intake valves. A fuel spray from a fuel injector is atomized when mixed with the dispersed intake air flow in the first and second branching passageways.

19 Claims, 10 Drawing Sheets

INTAKE PORT STRUCTURE FOR INTERNAL COMBUSTION ENGINE

BACKGROUND OF THE INVENTION

1. Field of the Invention

The present invention relates to an intake port structure for an internal combustion engine.

2. Background Information

Japanese Laid-Open Patent Publication No. 5-321678 describes one example of a conventional intake port structure for an internal combustion engine with spark ignition combustion. This intake port structure includes a fuel injector disposed in an intake air passage and a pair of intake valves provided for each cylinder of the engine. More specifically, the intake air passage includes a collector passageway disposed in an upstream section of the intake air passage and a pair of branching passageways downstream of the collector passageway such that the intake air passage branches into two paths from the collector passageway toward the intake valves. In this conventional intake port structure, both of the branching passageways are formed to have a considerable length in a substantially linear form. A crotch portion is formed between the branching passageways as a convex surface that protrudes toward the collector passageway (i.e., toward the upstream side of the intake port). The fuel injector is disposed in an upper portion of the collector passageway, and is configured and arranged to inject fuel toward a lower portion of the collector passageway to form an air-fuel mixture.

In view of the above, it will be apparent to those skilled in the art from this disclosure that there exists a need for an improved intake port structure. This invention addresses this need in the art as well as other needs, which will become apparent to those skilled in the art from this disclosure.

SUMMARY OF THE INVENTION

It has been discovered that with the conventional intake port structure disclosed in the above mentioned reference, the air-fuel mixture is introduced into a combustion chamber of each cylinder as retaining a layered flow. Thus, atomization of the fuel spray injected from the fuel injector is insufficient. In other words, there is a drawback in that the fuel in the air-fuel mixture is introduced into the cylinder in an insufficiently atomized state. In such case, formation of the homogeneous fuel mixture in the combustion chamber cannot be promoted, and the thermal efficiency is reduced.

It has been further discovered that the thermal efficiency can be improved by using a fuel injector that promotes atomization of the fuel spray by the fuel injector itself. However, although the atomization of the fuel spray can be achieved to a certain extent by using this kind of fuel injector, the cost of achieving further atomization is higher when the fuel injector alone is used to promote the atomization of the fuel spray.

Moreover, there are currently no intake port structure for an internal combustion engine with an arrangement that can improve both output performance (e.g., improve the air flow resistance index value) and the exhaust performance (e.g., reduce wall flows and the like).

The present invention was contrived in view of the above problems, and one object of the present invention is to provide an intake port structure that can further atomize the fuel spray when the air-fuel mixture is introduced from the intake port structure to the combustion chamber.

In order to achieve the above mentioned and other objectives of the present invention, an intake port structure for an internal combustion engine is provided that comprises an intake air passage, a fuel injector and an intake air flow impact section. The intake air passage includes a collector passageway and a pair of first and second branching passageways branching from the collector passageway toward first and second intake valve openings, respectively. The fuel injector is arranged in the intake air passage to inject a fuel stream into intake air that flows through the intake air passage. The intake air flow impact section is formed on a crotch portion between the first and second branching passageways, the intake air flow impact section being configured and arranged such that a portion of the intake air flowing in the intake passage collides against the intake air flow impact section to laterally disperse the intake air into the first and second branching passageways at areas encompassed by imaginary tubes projected from the first and second intake valve openings in a direction parallel to a center combustion chamber axis.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
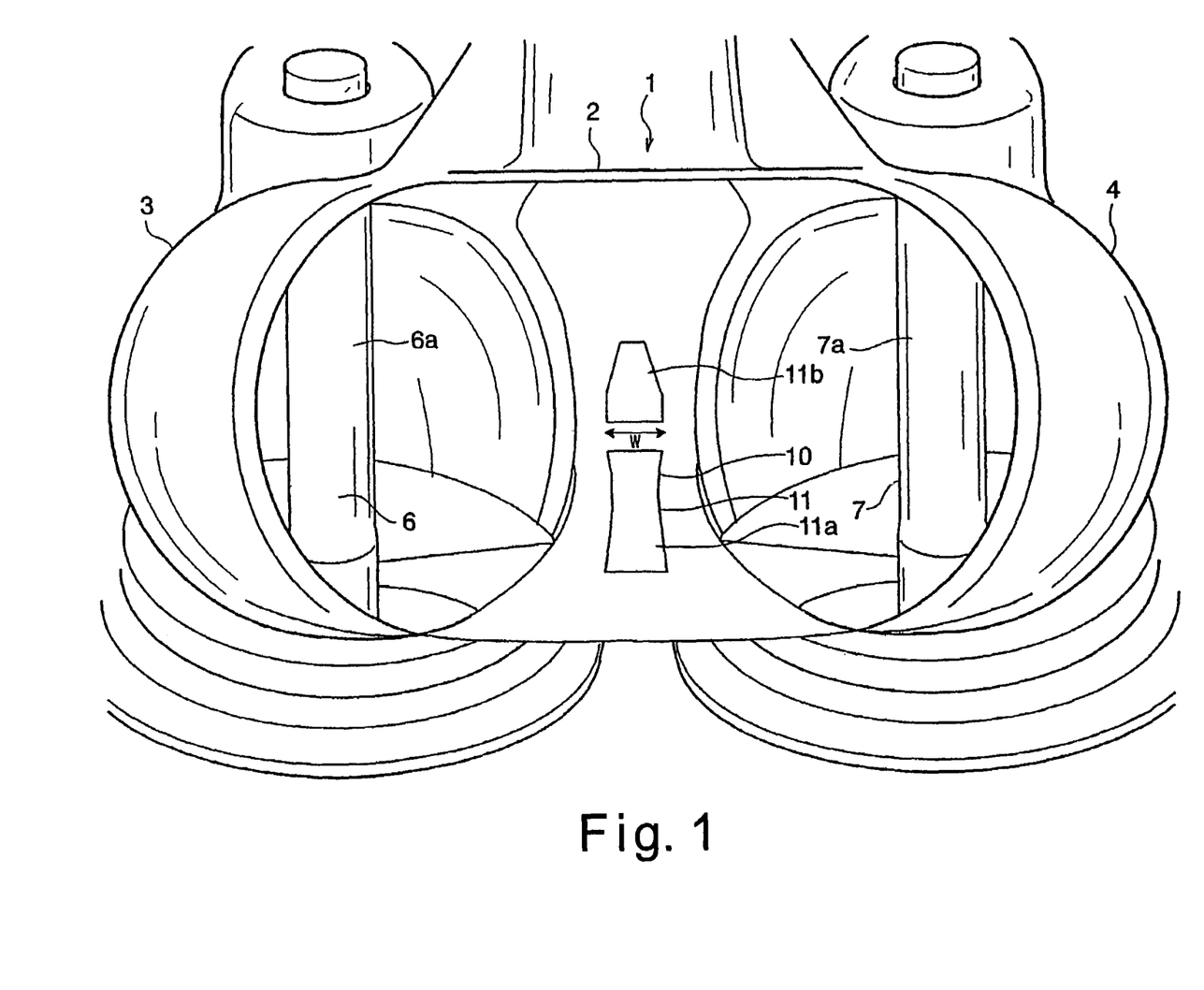
FIG. 1 is a cross-sectional view of an intake port structure taken across a collector passage disposed in an upstream side of the intake port structure illustrating a downstream side of the intake port structure in accordance with a first embodiment of the present invention.
Figure 2:
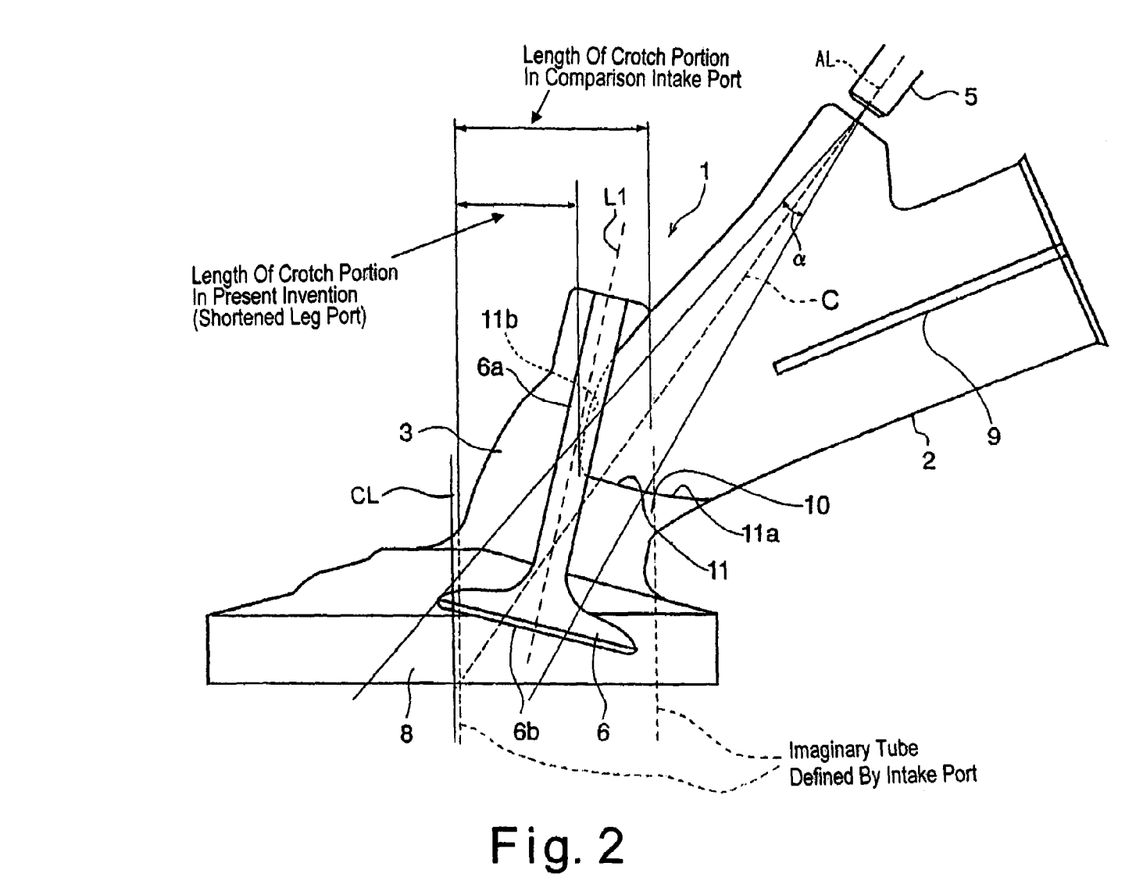
FIG. 2 is a schematic side elevational view of inside of the intake port structure illustrated in FIG. 1 in accordance with the first embodiment of the present invention.
Figure 3:
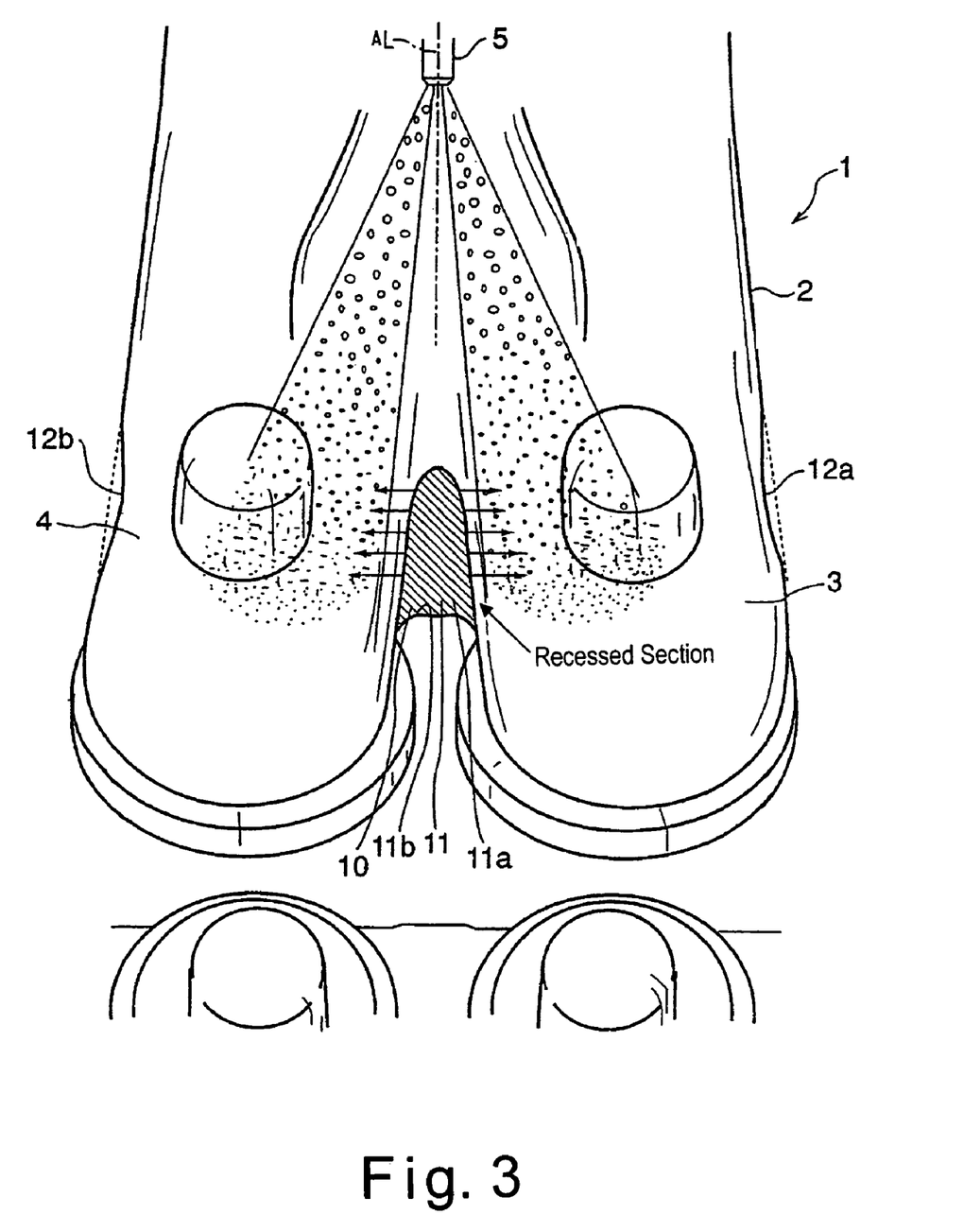
FIG. 3 is a schematic perspective view of the intake port structure illustrating a state in which a fuel is sprayed from an injector in the intake port structure illustrated in FIGS. 1 and 2 in accordance with the first embodiment of the present invention.
Figure 4:
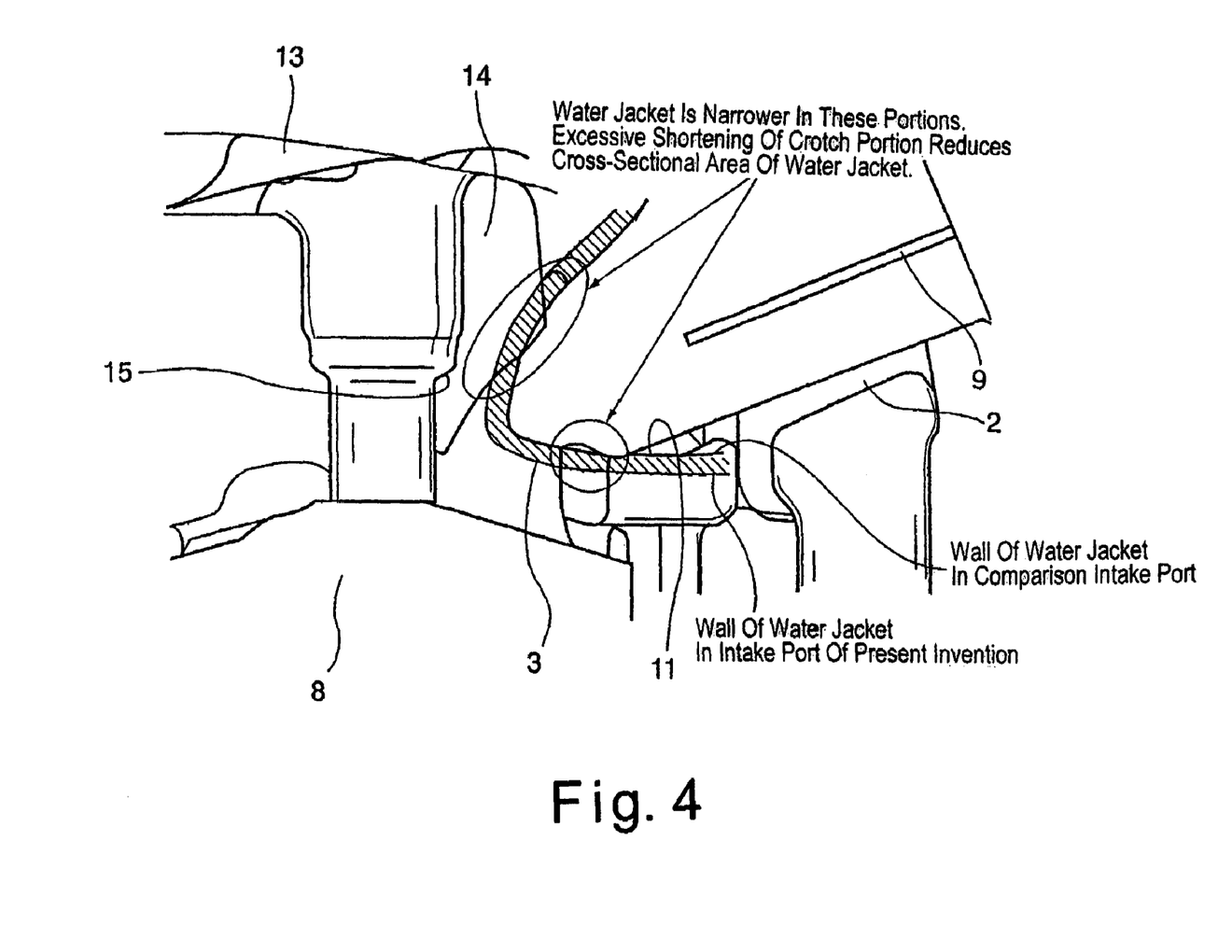
FIG. 4 is an enlarged, partial cross-sectional view illustrating an arrangement of a water jacket in an cylinder head in the intake port structure illustrated in FIGS. 1 to 3 in accordance with the first embodiment of the present invention.

Referring initially to FIGS. 1 to 3, an intake port structure 1 for an internal combustion engine is illustrated in accordance with a first embodiment of the present invention. The intake port structure 1 of the present invention includes an intake air passage comprising a collector passageway 2 disposed in the upstream of the intake air passage and a pair of first and second branching passageways 3 and 4 disposed in the downstream of the intake air passage. A fuel injector 5 is preferably provided in an upper portion of the collector passageway 2 such that the fuel injector 5 injects fuel sprays toward the downstream of the intake air passage. FIG. 1 is a cross-sectional view of the intake port structure 1 taken across the collector passageway 2 in a direction substantially perpendicular to the direction of flow in the intake air passage (from the upstream to the downstream) and viewed from an upstream side of the intake air passage. More specifically, FIG. 1 illustrates a structure of the first and second branching passageways 3 and 4 where the first and second branching passageways 3 and 4 branch from the collector passageway 2 toward the downstream section of the intake port structure 1. FIG. 2 is a schematic side view of inside of the intake port structure 1 illustrated in FIG. 1. FIG. 3 is a schematic perspective view illustrating a state in which fuel is sprayed from the fuel injector 5 toward the downstream section of the intake air passage of the intake port structure 1. FIG. 3 substantially corresponds to a view from upper side of the intake port structure 1 in a direction. FIG. 4 is an enlarged, partial cross-sectional view of the intake port structure 1 taken along a center line of the fuel injected from the fuel injector 5 as shown by a broken line C in FIG. 2. The intake port structure 1 is preferably arranged at each cylinder of an internal combustion engine in which the intake port structure 1 of the present invention is equipped.

As seen in FIG. 1, the first and second branching passageways 3 and 4 are arranged to branch from the collector passageway 2 into two distinct paths. In particular, the first and second branching passageways 3 and 4 extend from the collector passageway 2 to first and second intake valve openings that are defined by the valve seats for a pair of first and second intake valves 6 and 7, respectively. The first and second intake valves 6 and 7 are configured and arranged to selectively control an introduction of intake air from the intake port structure 1 to a combustion chamber 8 (inside the cylinder) disposed in the downstream side of the intake port structure 1. The collector passageway 2 is preferably provided with a partition wall 9 for partitioning the collector passageway 2 into upper and lower portions.

As explained above, the fuel injector 5 is preferably disposed in the upper portion of the collector passageway 2 as seen in FIG. 2. Of course, it will be apparent to those skilled in the art from this disclosure that each cylinder of the engine preferably has a fuel injector disposed in the intake port structure of the corresponding cylinder in the same construction as in FIGS. 1–4. The fuel injector 5 has a center axis AL that is preferably arranged in a plane that includes a center axis of the corresponding cylinder and the center axis of the collector passageway 2. Of course, it will be apparent to those skilled in the art from this disclosure that the intake port structure of the present invention can be alternatively arranged to have a single fuel injector used for injecting fuel into the intake air that is fed through the intake port structures to all cylinders of the internal combustion engine instead of providing the fuel injector 5 in each of the intake port structures 1 (only one shown) for each of the cylinders of the internal combustion engine. For example, the single fuel injector 5 can be disposed in an intake air collector (not shown) of an intake manifold (not shown). In such case, an air-fuel mixture is preferably formed in the intake manifold and distributed to each intake port structure 1 for each of the cylinders of the internal combustion engine.

The fuel injector 5 includes a fuel spray nozzle at a tip thereof such that fuel is sprayed in a cone shaped stream from the fuel spray nozzle towards head portions of the first and second intake valves 6 and 7 located in the intake ports of the intake port structure 1 as seen in FIGS. 2 and 3. More specifically, the fuel injector 5 in the present embodiment preferably includes a two-way fuel injection valve that is configured and arranged to spray fuel from the upper portion of the collector passage 2 of the intake port structure 1 in two distinct directions into the first and second branching passageways 3 and 4 so that the fuel is sprayed from the fuel injector 5 directly against each of the head portions of the first and second intake valves 6 and 7. Two-way fuel injection valves are conventional components that are well known in the art. Since the two-way fuel injection valve is well known in the art, the structure of such valve will not be discussed or illustrated in detail herein.

Moreover, the fuel injector 5 is preferably configured and arranged to inject the fuel with a fuel spray angle α in the longitudinal direction of the fuel injector 5 with respect to a vertical plan of the intake port structure 1. The fuel spray angle α is preferably set to approximately 10° as shown in FIG. 2.

Figure 8:
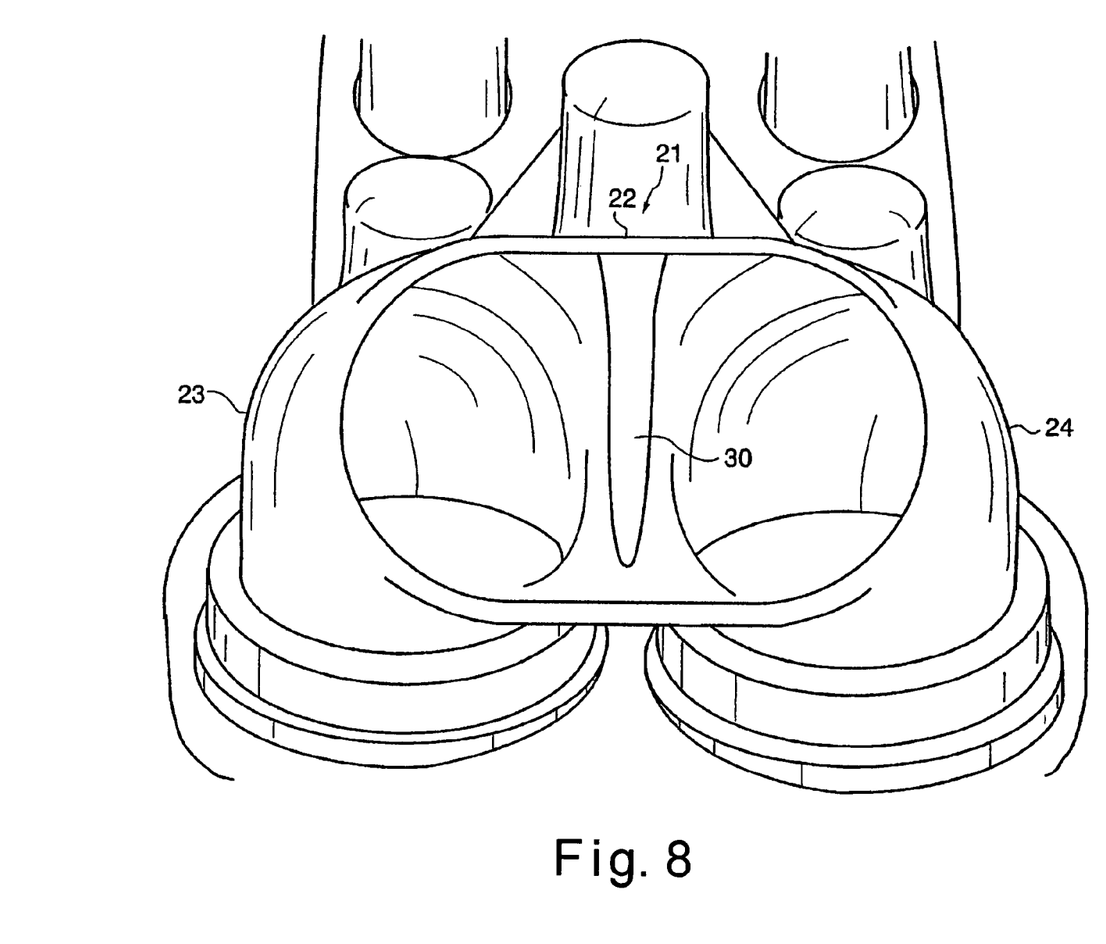
FIG. 8 is a cross-sectional view of a comparison intake port structure taken across a collector passageway disposed in an upstream side of the comparison intake port structure illustrating a downstream side of the comparison intake port structure.
Figure 9:
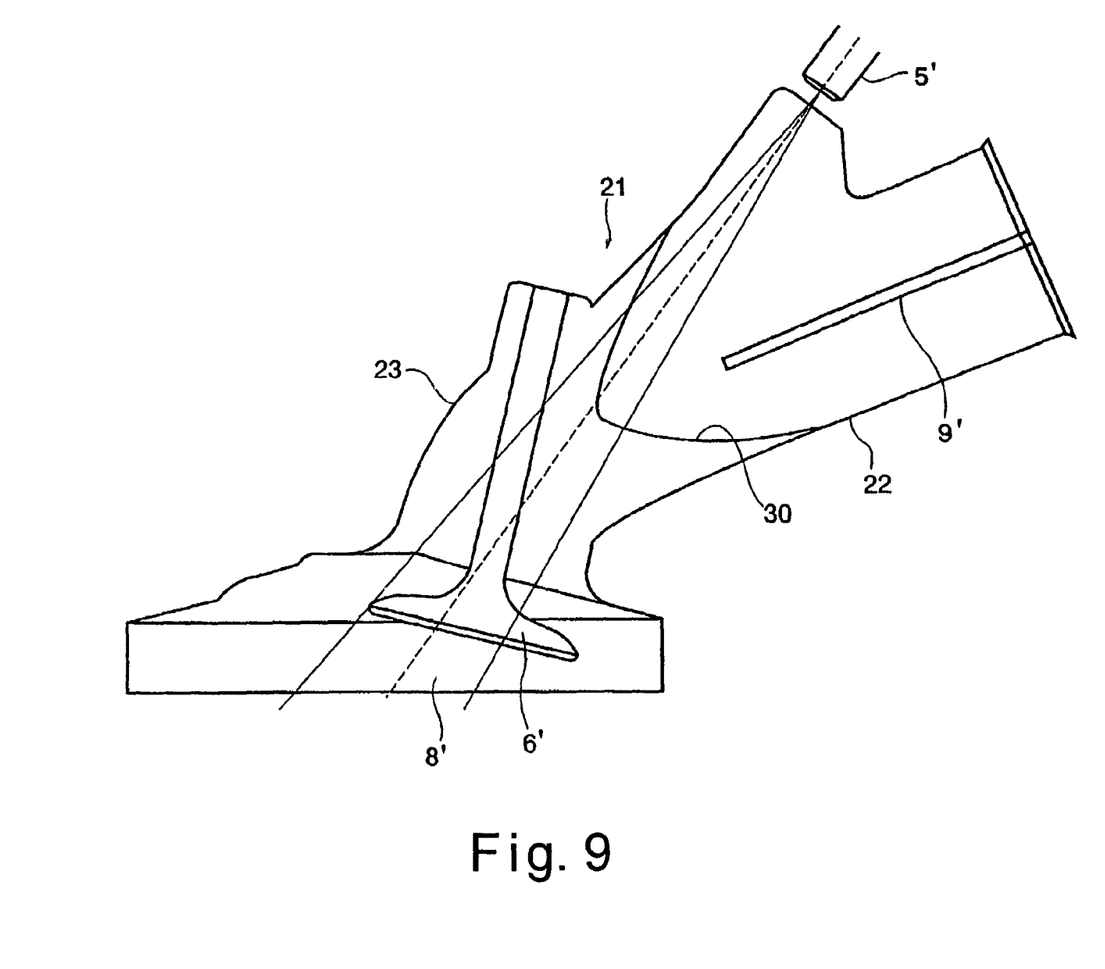
FIG. 9 is a schematic side elevational view of inside of the comparison intake port structure illustrated in FIG. 8.
Figure 10:
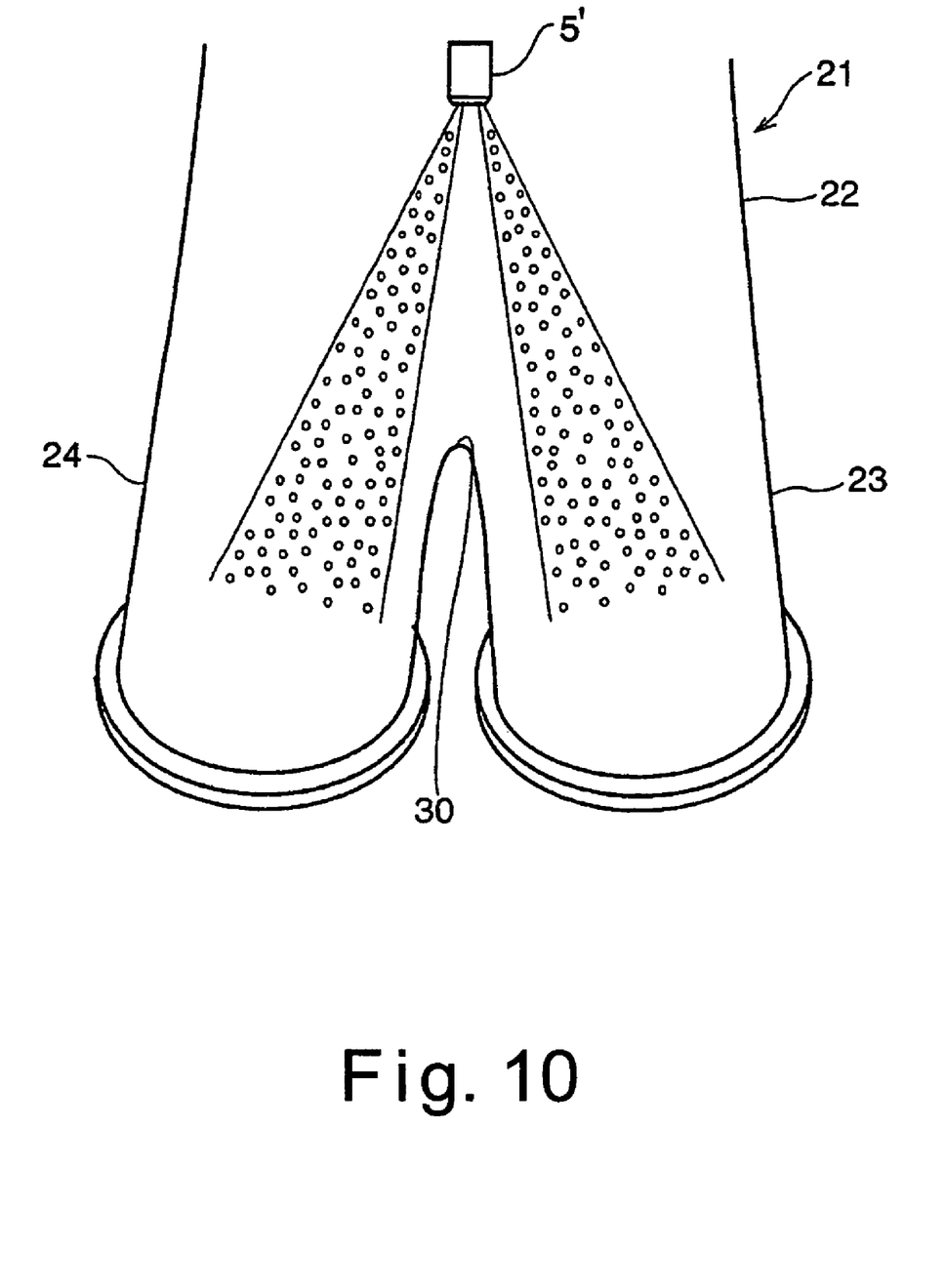
FIG. 10 is a schematic perspective view of the comparison intake port structure illustrated in FIGS. 8 and 9.

In the first embodiment of the present invention, the intake port structure 1 includes a ridge or crotch portion 10 formed between the first and second branching passageways 3 and 4. The crotch portion 10 is configured and arranged to form an intake air flow impact section 11. The intake air flow impact section 11 is preferably disposed in a path of the intake air flow that flows from an upstream section of the intake port structure 1 to a downstream section of the intake port structure 1 so that the intake air flow in the intake port structure 1 collides against the intake air flow impact section 11. More specifically, the intake air flow impact section 11 is configured and arranged such that the portion of the intake air that collides against the intake air flow impact section 11 is laterally dispersed into the first and second branching passageways 3 and 4 at areas encompassed by imaginary tubes (see FIG. 2) projecting from the first and second intake valve openings in a direction parallel to a center combustion chamber axis CL. As seen in FIG. 2, the intake air flow impact section 11 is preferably arranged as a shape in which a crotch portion of a comparison intake port structure illustrated in FIGS. 8 to 10 is partially cut away and recessed in a direction of a flow of the fuel spray. In other words, as seen in FIGS. 1 and 2, the intake air flow impact section 11 formed as a recessed section in the crotch portion 10. As seen in FIG. 2, the intake air flow impact section 11 is preferably arranged to be recessed (comparing to the crotch portion of the comparison intake port structure illustrated in FIGS. 8 to 10) toward the head portions of the first and second intake valves 6 and 7 along the center axis of the fuel sprayed from the fuel injector 5 to the vicinity of stem portions 6a and 7a of the first and second intake valves 6 and 7 as viewed from the side of the intake port structure 1. In other words, the crotch portion of the comparison intake port structure is formed as a convex surface that protrudes toward an upstream side of the comparison intake port structure. The crotch portion of the comparison intake port structure will be described in more detail below with reference to FIGS. 8 to 10 to further clarify the differences between the comparison intake port structure and the intake port structure 1 of the present invention.

Moreover, the intake air flow impact section 11 preferably includes a first impact surface 11a and a second impact surface 11b that are preferably configured as generally flat surfaces that are angled relative to each other. The first and second impact surfaces 11a and 11b are disposed on planes that are both substantially perpendicular to a hypothetical plane (i.e., a plane parallel to the surface of the paper in FIG. 2) that includes the center axis of the cylinder and the center axis of the collector passage 2. Additionally, the first impact surface 11a is preferably formed substantially parallel to valve end surfaces 6b and 7b of the head portions of the first and second intake valves 6 and 7, as viewed from the side of the intake port structure 1 as shown in FIG. 2. The second impact surface 11b is preferably formed substantially perpendicular to the impact surface 11a as shown in FIGS. 2 and 4.

In the illustrated embodiment, the first impact surface 11a is preferably formed substantially perpendicular to the longitudinal center axes of the stem portions 6a and 7a of the first and second intake valves 6 and 7. The first impact surface 11a is disposed on one side of the crotch portion 10 shown as a hatched portion (referred as "recessed section") in FIG. 3. The second impact surface 11b is preferably inclined in the axial direction of the stem portions 6a and 7a of the first and second intake valves 6 and 7 when viewed perpendicular to the hypothetical plane that includes the center axis of the cylinder and the center axis of the collector passageway 2 as shown in FIG. 2. In other words, the second impact surface 11b is preferably parallel to the longitudinal center axes of the stem portions 6a and 7a of the first and second intake valves 6 and 7 when viewed perpendicular to the hypothetical plane that includes the center axis of the cylinder and the center axis of the collector passageway 2 as shown in FIG. 2.

Accordingly, the first impact surface 11a and the second impact surface 11b of the intake air flow impact section 11 are configured and arranged to disperse a portion of the intake air flow that flows from the collector passageway 2 in a lateral direction (i.e., the direction substantially perpendicular to the intake air flow) as shown in FIG. 3. In other words, a portion of the intake air flow that flows inside the intake port structure 1 from the collector passageway 2 toward the downstream section of the air intake passage collides against the first impact surface 11a and the second impact surface 11b such that the intake air flow is dispersed in the lateral direction as viewed from above as in FIG. 3. With the intake port structure 1 of the present invention, the dispersion of the intake air flow inside the intake port structure 1 is further enhanced because portions of the intake air flow that collided against the first and second impact surfaces 11a and 11b merge and collide at a connecting portion between the first impact surface 11a and the second impact surface 11b shown in FIG. 2. Thus, the turbulent energy in the first branching passageway 3 and the second branching passageway 4 can be increased by providing the intake air flow impact section 11 as explained above.

The intake air flow impact section 11 including the first and second impact surfaces 11a and 11b is preferably formed on the center axis AL of the fuel injector 5 in the top plan view as shown FIG. 3. Therefore, after the fuel is sprayed from the fuel injector 5 toward the first and second branching passageways 3 and 4 (i.e., toward the head portions of the intake valves 6 and 7), the fuel can be further atomized by being mixed with the intake air flow dispersed in the lateral direction after the intake air collides against the intake air flow impact section 11 as shown FIG. 3.

As seen in FIG. 2, the crotch portion 10 of the intake port structure 1 of the first embodiment is formed considerably recessed to the vicinity of the stem portions 6a and 7a of the first and second intake valves 6 and 7 comparing to the crotch portion of the comparison intake port structure which is formed further upstream from the stem portions 6a and 7a of the first and second intake valves 6 and 7. In other words, a distance between the tip of the fuel injector 5 and the intake air flow impact section 11 is larger in the intake port structure 1 of the present invention than in the comparison example of the intake port structure.

Accordingly, atomization of the fuel is further promoted because the intake air flow disperses in the lateral direction (toward the first branching passageway 3 and the second branching passageway 4) of the intake air flow impact section 11 formed on the crotch portion 10 such that the intake air flow is mixed with the fuel spray injected from the fuel injector 5 when the intake air flow collides against the impact surface 11, as shown in FIG. 3. As a result, an increase in the turbulent energy in the first and second branching passageways 3 and 4 can be ensured. Thus, fuel deposits due to wall flows on back sides of the head portions of the first and second intake valves 6 and 7 can be reduced. Furthermore, HC emission during startup can be reduced and a response characteristic during transient period can be improved.

Moreover, in the intake port structure 1 of the first embodiment of the present invention, the intake air flow impact section 11 preferably has an effective lateral width W (e.g., a lateral width of the first and second impact surfaces 11a and 11b) that is relatively large as shown in FIG. 1. Thus, the turbulent energy can be further increased in the first and second branching passageways 3 and 4, and the fuel spray can be further atomized so that homogeneousness of the air-fuel mixture within the combustion chamber 8 can be improved when the intake air flow collides against the intake air flow impact section 11. Moreover, the fuel is atomized by providing the intake air flow impact section 11 even when, for example, the temperatures of the first and second intake valves 6 and 7 are low during low-temperature startup, and thus, the wall flows can be reduced during the low-temperature startup.

Furthermore, in the first embodiment of the present invention, a diameter of the intake passage is preferably constricted in order to match the velocity of the intake air flow (flow rate) in the collector passageway 2 of the intake port structure 1 with the flow rate (overall flow rate) of the air-fuel mixture in the first branching passageway 3 and the second branching passageway 4, as shown in FIG. 3. More specifically, in the intake port structure 1 of the first embodiment, as well as the recessed formation of the intake air flow impact section 11, a pair of cross-sectional area adjustment portions 12a and 12b are preferably provided at the connecting portion between the collector passageway 2 and the first and second branching passageways 3 and 4 on both sides of the intake air flow impact section 11. The cross-sectional area adjustment portions 12a and 12b are preferably constricted so that the total cross-sectional area of the first and second branching passageways 3 and 4 is substantially equal to the cross-sectional area of the collector passageway 2. The comparison example of the intake port structure that does not include the cross-sectional area adjustment portions 12a and 12b is indicated with dotted lines in FIG. 3.

The intake port structure 1 of the first embodiment can be arranged such that branching angles of the first and second branching passageways 3 and 4 (i.e., the angles at which center axes of the first and second branching passageways 3 and 4 intersect with the center axis of collector passageway 2) are larger than the angles shown in FIG. 3. In such case, the intensity of the flow of the air-fuel mixture in the downstream of the intake air flow impact section 11 (i.e., in the first and second branching passageways 3 and 4) is increased, and the homogeneousness of the air-fuel mixture can be improved.

For the illustration purposes, the comparison intake port structure (a comparison intake port structure 21) as mentioned above is illustrated in detail with reference to FIGS. 8 to 10 to further clarify the differences between the intake port structure 1 of the present invention and the comparison intake port structure 21. The comparison intake port structure 21 illustrated in FIGS. 8 to 10 substantially corresponds to, for example, the intake port structure disclosed in Japanese Laid-Open Patent Publication No. 5-321678 as mentioned above.

FIG. 8 is a cross-sectional view taken at a collector passageway 22 in a lateral direction such that first and second branching passageways 23 and 24 are viewed from the upstream of the collector passageway 22. FIG. 9 is a schematic side elevational view of the comparison intake port structure 21. FIG. 10 is a diagram showing the state in which fuel is sprayed from a fuel injector 5' in the conventional intake port structure 21.

The comparison intake port structure 21 provided for each cylinder includes a collector passageway 22 in the upstream side and the first and second branching passageways 23 and 24 that branch into two paths in the downstream section of the intake passage from the collector passageway 22 toward first and second intake valves 6' and 7', respectively. The first and second branching passageways 23 and 24 are formed with a considerable length in substantially linear shapes. As seen in FIG. 10, a crotch portion 30 between the first and second branching passageways 23 and 24 is formed as a convex surface.

Thus, in the comparison intake port structure 21, the fresh intake air introduced into the collector passageway 22 is mixed with the fuel spray injected from the fuel injector 5' toward the first and second intake valves 6' and 7' to form an air-fuel mixture. With the arrangement of the comparison intake port structure 21, the air-fuel mixture is kept in a layered-flow state as the air-fuel mixture is introduced into a combustion chamber 8' (into the cylinder) by controlling the first and second intake valves 6' and 7', which are disposed downstream of the first and second branching passageways 23 and 24, respectively.

In the comparison intake port structure 21, a portion of the intake air flow (fresh intake air) is directed either into the first branching passageway 23 or into the second branching passageway 24 by the crotch portion 30. As seen in FIG. 10, since the crotch portion 30 is formed as a smooth convex surface that protrudes toward the upstream side of the comparison intake port structure 21, the intake air flow is divided by the crotch portion 30 and introduced into the combustion chamber 8' while remaining a layered flow. The layered state in the tumbling flow inside the combustion chamber 8' is promoted and stable, lean combustion can be maintained.

However, in the comparison intake port structure 21, the fuel cannot be inadequately atomized in the air-fuel mixture because the intake air flow cannot obtain sufficient energy to adequately atomize the fuel merely through mixing the intake air flow with the fuel spray from the fuel injector 5'. Thus, the homogeneousness of the air-fuel mixture cannot be improved in the comparison intake port structure 21. Main reasons why the atomization of the fuel is not promoted in the comparison intake port structure 21 include that the lengths of the first and second branching passageways 23 and 24 are insufficient, and that the crotch portion 30 is formed as a smooth convex surface.

On the other hand, in the intake port structure 1 of the first embodiment of the present invention, the turbulent energies in the first and second branching passageways 3 and 4 are increased by providing the intake flow impact section 11, and thus, further atomization of the fuel spray is ensured. The first and second branching passageways 3 and 4 are formed with relatively short lengths (shorten leg shapes) comparing to the first and second branching passageways 23 and 24 of the comparison intake port structure 21, and the intake air flow impact section 11 is provided on the crotch portion 10 against which the intake air flow collides on the crotch portion 10. The homogeneousness in the air-fuel mixture is improved as the intake air flow collides against the intake flow impact section 11 and the atomization of the fuel in a formation of the air-fuel mixture is promoted. In other words, atomization of the spray is promoted by laterally dispersing a portion of the intake air flow by the intake air flow impact section 11 to increase the energy of the intake air flow, and mixing the fuel sprayed from the fuel injector 5 with the dispersed intake air flow.

FIG. 4 is a schematic cross-sectional view of a cylinder head 13 and the intake port structure 1 illustrating a water jacket 14 formed in the cylinder head 13. FIG. 4 shows a wall of the water jacket 14 in the intake port structure 1 of the present invention in comparison with a wall of a water jacket in a comparison intake port structure such as the comparison intake port structure 21.

As explained above, the crotch portion 10 of the intake port structure 1 is recessed to the vicinity of the stem portions 6a and 7a of the first and second intake valves 6 and 7 as shown in FIG. 2 in order to form the intake air flow impact section 11 of the present invention. Thus, in the arrangement of the intake port structure 1 of the present invention, a cooling water passage in the water jacket 14 is partially constricted at a portion where the crotch portion 10 is recessed. However, if the cooling water passage in the water jacket 14 becomes too narrow, knocking or other undesired effects may occur as a result of insufficient cooling with cooling water in the cylinder head 13.

In the comparison intake port structure 21 illustrated in FIGS. 8 to 10, the wall of the water jacket is configured such that an adequate cooling water passage is formed in the water jacket because the crotch portion of the comparison intake port structure 21 is formed with a considerable length. However, when the intake port structure 1 is provided with the relatively short crotch portion 10 as in the present invention, the cooling water passage in the water jacket 14 in a portion shown by the shaded area in FIG. 4 becomes narrow. In particular, due to the recessed crotch portion 10 of the intake port structure 1, a portion of the cooling water passage of the water jacket 14 between the first and second branching passageways 3 and 4 and an ignition plug wall 15 becomes narrow.

Accordingly, in the present invention, the ignition plug wall 15 is preferably formed relatively thinner (e.g., thinner than an ignition plug wall in a conventional intake port structure) to provide an adequate cooling water passage between the first and second branching passageways 3 and 4 and the ignition plug wall 15. Moreover, a wall of the cooling water passage in the vicinity of the first and second intake valves 6 and 7 is preferably also formed relatively thinner such that an adequate flow of the cooling water in the cooling water passage can be supplied as well as sufficient strength can be maintained.

In the intake port structure 1 of the present invention, the crotch portion 10 is recessed to the stem portions 6a and 7a of the first and second intake valves 6 and 7 to form the intake air flow impact section 11. If the crotch portion 10 is recessed beyond the stem portions 6a and 7a of the first and second intake valves 6 and 7 from that as shown in FIG. 2, then a cross-sectional area of the cooling water passage of the water jacket 14 will be further reduced. In such case, the moldability of the water jacket 14 may become degraded, and the cooling effect of the water jacket 14 may be decreased. Therefore, the crotch portion 10 with the intake air flow impact section 11 should preferably be formed in a position that is in the vicinity of the stem portions 6a and 7a of the first and second intake valves 6 and 7 as shown in FIG. 2. In the arrangement of the present invention, the turbulent energy in the intake air flow is thereby increased while the cooling water flow rate in the water jacket 14 that is substantially equal to the cooling water flow rate in the comparison example of the intake port structure can be secured. Thus, the occurrence of knocking and other undesired effects can be effectively prevented in the intake port structure 1 of the present invention.

Figure 5:
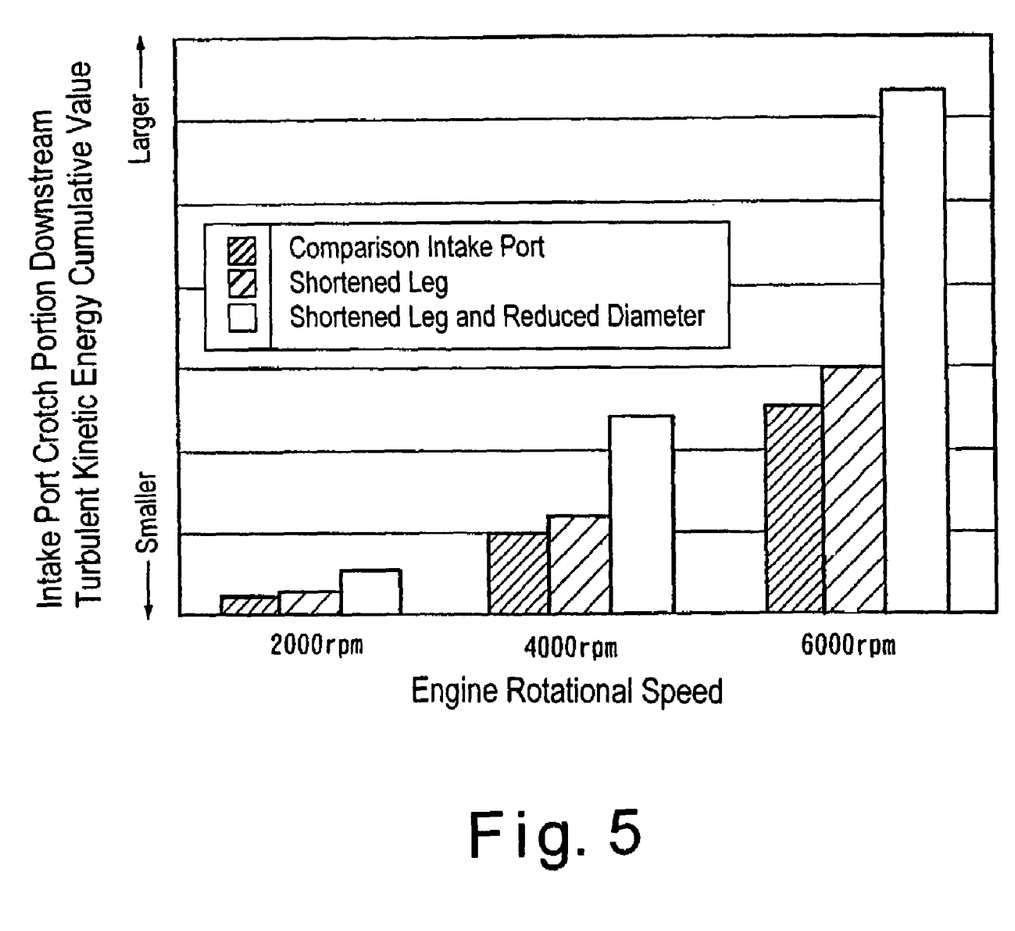
FIG. 5 is a bar chart for explaining a comparison between cumulative values of turbulent kinetic energy for different engine rotational speeds in a comparison intake port structure and the intake port structure in accordance with the first embodiment of the present invention.

FIG. 5 is a bar chart for explaining a comparison between cumulative values of the turbulent kinetic energy for different rotational speeds in the comparison intake port structure 21 and the intake port structure 1 in accordance with the first embodiment of the present invention. More specifically, the cumulative values of the turbulent kinetic energy downstream of the crotch portion 10 of the present invention and the crotch portion 30 of the comparison example (i.e., the first branching passageways 3 and 23 or the second branching passageways 4 and 24) are compared at various rotational speeds (2,000, 4,000, and 6,000 rpm) in the intake port structure 1 of the present invention and the comparison intake port structure 21. Moreover, in FIG. 5, a "shortened leg port" refers to the intake port structure 1 of the present invention in which the intake air flow impact section 11 is formed on the crotch portion 10 where the first and second branching passageways 3 and 4 are formed, and a "shortened leg port and reduced diameter" refers to the intake port structure 1 in accordance with the present invention in which the intake air flow impact section 11 is formed on the crotch portion 10 and the diameters of the first and second branching passageways 3 and 4 are reduced by providing the cross-sectional area adjustment portions 12a and 12b as the intake port structure 1 illustrated in FIGS. 1 to 3.

As seen in FIG. 5, the intake port structure 1 of the present invention (i.e., "shortened leg port" and "shortened leg port and reduced diameter") has an increased turbulent kinetic energy on the downstream side of the crotch portion 10 (the intake air flow impact section 11) of the intake port structure 1 than the turbulent kinetic energy on the downstream side of the crotch portion 30 of the comparison intake port structure 21 at each of the rotational speeds. Moreover, as seen in FIG. 5, when the cross-sectional area adjustment portions 12a and 12b are formed in the first and second branching passageways 3 and 4 of the intake port structure 1 ("shortened leg port and reduced diameter"), the turbulent energy can be further increased. Thus, the intake port structure 1 of the present invention is configured and arranged to increase the turbulent energy in the downstream of the crotch portion 10 to promote the atomization of the fuel injected from the fuel injector 5.

Figure 6:
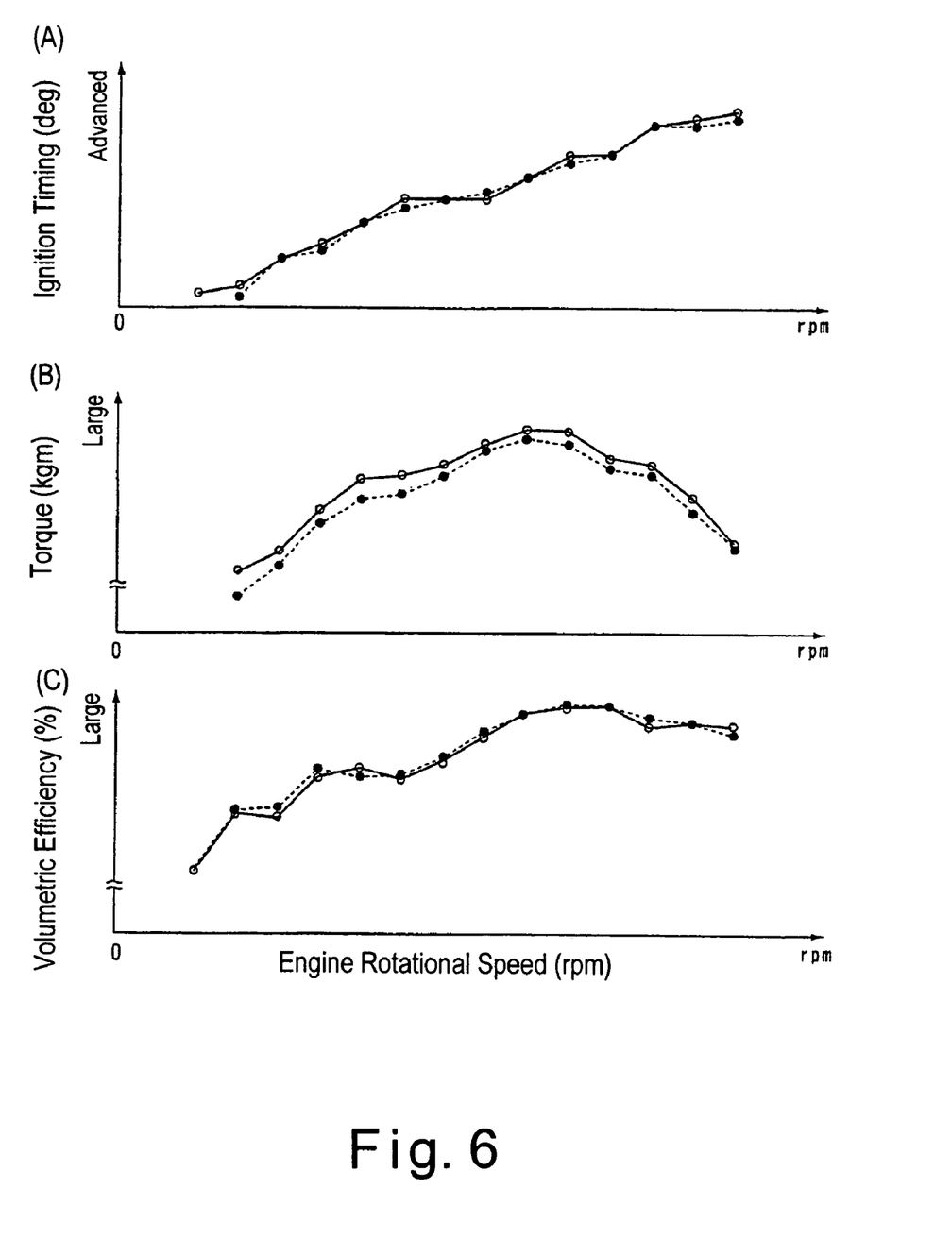
FIG. 6 is a series of line charts of engine characteristics including volumetric efficiency, torque, and ignition timing with respect to the engine speed in the comparison intake port structure and the intake port structure in accordance with the first embodiment of the present invention.

FIG. 6 is a series of line charts of engine characteristics at full throttle including volumetric efficiency (%), torque (kgm), and ignition timing (deg) with respect to the engine speed in a comparison intake port structure 21 and the intake port structure 1 in accordance with the first embodiment of the present invention. In FIG. 6, black circles "●" indicate the characteristics of the engine when the comparison intake port structure 21 is used, and white circles "○" indicate the characteristics of the engine when the intake port structure 1 (shortened leg port) of the present invention is used.

As seen in the torque characteristic chart of FIG. 6 (in the middle), in the intake port structure 1 of the present invention, the torque output is improved by an amount equivalent to the difference between the intake port structure 1 of the present invention (shown with the white circles "○") and the comparison intake port structure 21 (shown with black circles "●") even when the volumetric efficiency (bottom in FIG. 6) and the ignition timing (top in FIG. 6) are substantially equal in the intake port structure 1 of the present invention and the comparison intake port structure 21. This torque difference between the intake port structure 1 of the present invention and the comparison intake port structure 21 is considered to be occurred because the portion of the fuel, which is not combusted when the comparison intake port structure 21 is used, is combusted in the intake port structure 1 of the present invention. Therefore, it is apparent that thermal efficiency is improved by using the intake port structure 1 of the present invention.

In particular, FIG. 6 shows an increase in torque across a broad range can be ensured in the low and medium speed ranges when the intake port structure 1 of the present invention is used. In other words, in the high speed range (e.g., 6,000 rpm), the flow rate of the air-fuel mixture in the intake port structure 1 is inherently high, so homogeneousness of the air-fuel mixture in the combustion chamber 8 may not be adequately improved even if the turbulent energy in the intake port structure 1 is high, as shown in FIG. 5. However, since the flow rate of the air-fuel mixture is low in the low and medium speed ranges, an adequate improvement in the homogeneousness of the air-fuel mixture can be ensured by using the intake port structure 1 of the present invention even if the turbulent energy is slightly reduced as shown in FIG. 5.

In a direct-injection internal combustion engine, the amount of fuel injected directly into the cylinder during the intake stroke is increased such that the latent heat of vaporization produced by the fuel is used to cool the internal combustion engine. Thus, in the direct-injection internal combustion engine, the air intake temperature is reduced to improve the charging efficiency of the air. In the same manner, latent heat of vaporization is used in the intake port structure 1 of the present invention to improve the charging efficiency of air in the cylinder. In other words, the air-fuel mixture is formed in advance in the intake port structure 1, and the air-fuel mixture is introduced to the cylinder when the first and second intake valves 6 and 7 are open. Then, the timing of fuel injection from the fuel injector 5 is changed and the fuel is sprayed toward the head portions 6a and 7a of the first and second intake valves 6 and 7 when the first and second intake valves 6 and 7 are open. In such case, the turbulent energy of the intake air flow is increased by the intake air flow impact section 11. Thus, atomization of the fuel is further promoted, and charging efficiency in the cylinder is improved.

Accordingly, in the first embodiment of the present invention, the intake port structure 1 for the internal combustion engine includes the fuel injector 5 disposed in the intake passage (e.g., upper portion of the collector passageway 2), the first and second intake valves 6 and 7 provided for each cylinder. The intake port structure 1 is provided for each cylinder of the engine, and has the collector passageway 2 on the upstream side, and the first and second branching passageways 3 and 4 that branch two ways from the collector passageway 2 and are directed toward the first and second intake valves 6 and 7. The intake port structure 1 further includes the intake air flow impact section 11 formed on the crotch portion 10 between the first and second branching passageways 3 and 4 against which the intake air flow in the intake passage collide. Therefore, the turbulent energy in the intake port structure 1 (i.e., turbulent energy in the first and second branching passageways 3 and 4) is increased by the intake air flow impact section 11, and the fuel spray can be further atomized in the intake port structure 1. Further atomization of the fuel spray improves the homogeneousness of the air-fuel mixture in the combustion chamber 8. Moreover, the thermal efficiency can be improved and a reduction in the unburned gas (HC and the like) in the exhaust gas can be ensured. Specifically, the intake port structure 1 of the present invention can also effectively improve the atomization of the fuel spray for the fuel injected during the intake stroke.

Moreover, in accordance with the first embodiment, the intake air flow impact section 11 is formed in a position recessed to the vicinity of the stem portions 6a and 7a of the first and second intake valves 6 and 7, respectively. Therefore, the turbulent energy on the downstream side of the intake air flow impact section 11 is increased than in the comparison intake port structure 21. As a result, atomization of the fuel in the air-fuel mixture is further promoted, and the thermal efficiency can be improved as a result of increasing the homogeneousness of the air-fuel mixture inside the combustion chamber 8.

Furthermore, in accordance with the first embodiment, the intake air flow impact section 11 is configured and arranged to include at least one flat surface (the first or second impact surface 11a or 11b). Therefore, the intake air flow is configured and arranged to collide against the at least one flat surface of the intake air flow impact section 11. Accordingly, the turbulent energy on the downstream side of the intake air flow impact section 11 can be further increased.

Also, in the first embodiment of the present invention, the first and second impact surfaces 11a and 11b constituting the intake air flow impact section 11 are formed substantially perpendicular to the hypothetical plane (a plane parallel to the paper surface of FIG. 2) that includes the center axis of the cylinder and the center axis of the collector passageway 2. Therefore, the intake air flow in the intake passage of the intake port structure 1 can be dispersed in the lateral direction of the first and second impact surfaces 11a and 11b (i.e., direction substantially perpendicular to the hypothetical plane), and the turbulent energy of the intake air flow can be further increased.

Furthermore, in accordance with the first embodiment, the intake air flow impact section 11 is configured and arranged to include the first impact surface 11a that is formed substantially parallel to the valve end surfaces 6b and 7b of the first and second intake valves 6 and 7. Therefore, atomization of the fuel can be promoted by mixing fuel sprayed from the fuel injector 5 and the intake air flow dispersed by the first impact surface 11a.

Also, in accordance with the first embodiment, the intake air flow impact section 11 is further configured and arranged to include the second impact surface 11b that is inclined in the axial direction of the stem portions 6a and 7a of the first and second intake valves 6 and 7 when viewed perpendicular to the hypothetical plane (a plane parallel to the paper surface of FIG. 2) that includes the center axis of the cylinder and the center axis of the collector passageway 2. Therefore, atomization of the fuel can be promoted by mixing fuel sprayed from the fuel injector 5 and the intake air flow dispersed by the second impact surface 11b.

Moreover, in the first embodiment, the connector portion between the collector passageway 2 and the first and second branching passageways 3 and 4 preferably includes the cross-sectional area adjustment portions 12a and 12b in which the diameters of the first and second branching passageways 3 and 4 are constricted so that the overall cross sectional area of the first and second branching passageways 3 and 4 are substantially equal to the cross-sectional area of the collector passageway 2. Therefore, the intake air flow rate (flow rate) in the collector passageway 2 and the flow rate (overall flow rate) of the air-fuel mixture in the first and second branching passageways 3 and 4 can be substantially matched.

Furthermore, in accordance with the first embodiment, the fuel injector 5 is disposed in the upper portion of the collector passageway 2 of the intake port structure 1, and the center axis AL of the fuel injector 5 is disposed in the hypothetical plane that includes the center axis of the cylinder and the center axis of the collector passageway 2. Therefore, the fuel injected from the fuel injector 5 can be easily sprayed toward the first and second branching passageways 3 and 4.

Also, in accordance with the first embodiment, the fuel injector 5 preferably includes the two-way fuel injection valve for spraying fuel along two distinct paths from the upper portion of the collector passageway 2 of the intake port structure 1 into the first and second branching passageways 3 and 4. Therefore, atomization of the fuel spray is promoted when fuel spray injected from the fuel injector 5 is mixed with the intake air flow dispersed to both sides of the intake air flow impact section 11 when the intake air flow collides against the intake air flow impact section 11.

Accordingly, the intake port structure 1 of the present invention has the effect of increasing the turbulent energy inside the intake port structure 1 (i.e., in the first and second branching passageways 3 and 4) by providing the intake air flow impact section 11 on the crotch portion 10 between the first and second branching passageways 3 and 4. Thus, the intake port structure 1 of the present invention is configured and arranged to promote further atomization of the fuel spray injected from the fuel injector 5. Further atomization of the fuel spray improves the homogeneousness of the air-fuel mixture and the thermal efficiency, which results in a better exhaust performance.

Second Embodiment

Figure 7:
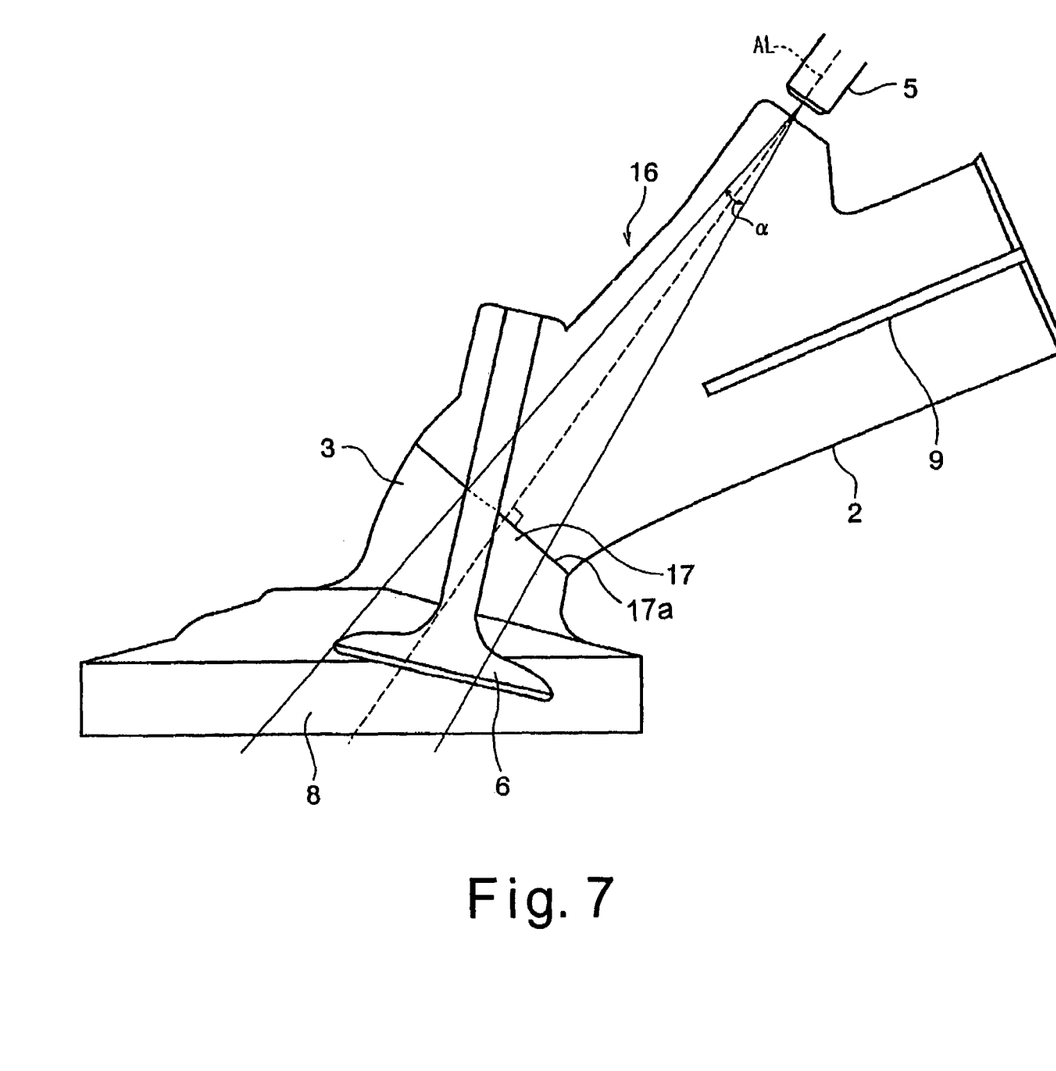
FIG. 7 is a schematic side elevational view of inside of an intake port structure in accordance with a second embodiment of the present invention.

Referring now to FIG. 7, an intake port structure 16 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The intake port structure 16 of the second embodiment is substantially identical to the intake port structure 1 of the first embodiment, except for a structure of an intake air flow impact section 17 of the intake port structure 16 that is different from the intake air flow impact section 11 of the intake port structure 1. More specifically, the intake air flow impact section 17 of the intake port structure 16 of the second embodiment includes a single flat impact surface 17a that is recessed to the vicinity of the first and second intake valves 6 and 7. The impact surface 17a is formed substantially perpendicular to the center axis AL of the fuel injector 5 (center line of the fuel sprays from the fuel injector 5) when viewed (in side view) perpendicular to the hypothetical plane that includes the center axis of the cylinder and the center line of the collector passageway 2 as shown in FIG. 7.

In the second embodiment of the present invention, the intake air flow from the collector passageway 2 is configured and arranged to collide against the impact surface 17a almost perpendicularly. Therefore, the portion of the intake air flow collided against the impact surface 17a is configured and arranged to disperse laterally to both sides of the intake air flow impact section 17. As in the first embodiment, the fuel is sprayed from the fuel injector 5 toward the first and second branching passageways 3 and 4 (i.e., toward the head portions of the first and second intake valves 6 and 7). Therefore, atomization of the fuel is promoted, and the homogeneousness of the air-fuel mixture in the combustion chamber 8 is improved. Therefore, thermal efficiency is increased by mixing the intake air flow and fuel spray on both sides of the intake air flow impact section 17 in the intake port structure 16 of the second embodiment.

Alternatively, the impact surface 17a can be arranged such that the intake air flow from the collector passageway 2 collides against the impact surface 17a substantially perpendicularly. Also, the impact surface 17a can be arranged such that the intake air flow from the collector passageway 2 collides against the impact surface 17a at an angle that optimizes fuel atomization, which is obtained experimental basis and the like.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Also terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-429598. The entire disclosure of Japanese Patent Application No. 2003-429598 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An intake port structure for an internal combustion engine comprising:
   an intake air passage including a collector passageway and a pair of first and second branching passageways branching from the collector passageway toward first and second intake valve openings, respectively;
   a fuel injector arranged in the intake air passage to inject a fuel stream into intake air that flows through the intake air passage; and
   an intake air flow impact section formed on a crotch portion between the first and second branching passageways with a downstream edge of the intake air flow impact section being disposed downstream of upstream edges of imaginary tubes projected from the first and second intake valve openings in a direction parallel to a center combustion chamber axis with respect to the intake air flowing in the intake air passage such that a portion of the intake air flowing in the intake air passage collides against the intake air flow impact section to laterally disperse the intake air into the first and second branching passageways at areas encompassed by the imaginary tubes.

2. The intake port structure as recited in claim 1, wherein the intake air flow impact section is recessed to a vicinity of center axes of the first and second intake valve openings.

3. The intake port structure as recited in claim 1, wherein the intake air flow impact section includes at least a first generally flat surface.

4. The intake port structure as recited in claim 3, wherein the first generally flat surface of the intake air flow impact section is oriented in a plane that is substantially perpendicular to a plane passing through the combustion chamber axis and a center axis of the collector passageway.

5. The intake port structure as recited in claim 2, wherein the intake air flow impact section includes at least a first generally flat surface.

6. The intake port structure as recited in claim 5, wherein the first generally flat surface of the intake air flow impact section is oriented in a plane that is substantially perpendicular to a plane passing through the combustion chamber axis and a center axis of the collector passageway.

7. The intake port structure as recited in claim 6, wherein the first generally flat surface is formed substantially parallel to a plane encompassing the first and second intake valve openings.

8. The intake port structure as recited in claim 1, wherein the intake air flow impact section includes at least a first impact surface formed substantially parallel to a plane encompassing the first and second intake valve openings.

9. An intake port structure for an internal combustion engine comprising:
an intake air passage including a collector passageway and a pair of first and second branching passageways branching from the collector passageway toward first and second intake valve openings, respectively;
a fuel injector arranged in the intake air passage to inject a fuel stream into intake air that flows through the intake air passage; and
an intake air flow impact section formed on a crotch portion between the first and second branching passageways, the intake air flow impact section being configured and arranged such that a portion of the intake air flowing in the intake air passage collides against the intake air flow impact section to laterally disperse the intake air into the first and second branching passageways at areas encompassed by imaginary tubes projected from the first and second intake valve openings in a direction parallel to a center combustion chamber axis, the intake air flow impact section including at least a first generally flat surface that is oriented in a plane that is substantially perpendicular to a plane passing through the combustion chamber axis and a center axis of the collector passageway, the intake air flow impact section including at least a second impact surface that is oriented in a plane substantially perpendicular to a plane encompassing the first and second intake valve openings.

10. An intake port structure for an internal combustion engine comprising:
an intake air passage including a collector passageway and a pair of first and second branching passageways branching from the collector passageway toward first and second intake valve openings, respectively;
a fuel injector arranged in the intake air passage to inject a fuel stream into intake air that flows through the intake air passage; and
an intake air flow impact section formed on a crotch portion between the first and second branching passageways, the intake air flow impact section being configured and arranged such that a portion of the intake air flowing in the intake air passage collides against the intake air flow impact section to laterally disperse the intake air into the first and second branching passageways at areas encompassed by imaginary tubes projected from the first and second intake valve openings in a direction parallel to a center combustion chamber axis, the intake air flow impact section being recessed to a vicinity of center axes of the first and second intake valve openings, the intake air flow impact section including at least a first generally flat surface that is oriented in a plane that is substantially perpendicular to a plane passing through the combustion chamber axis and a center axis of the collector passageway and formed in a plane substantially parallel to a plane encompassing the first and second intake valve openings, the intake air flow impact section including at least a second impact surface that is oriented in a plane substantially perpendicular to a plane encompassing the first and second intake valve openings.

11. The intake port structure as recited in claims 1, wherein
the intake air flow impact section includes at least a first flat surface formed in a plane that is substantially perpendicular to a plane passing through a center axis of the fuel injector when viewed perpendicularly to a plane passing through the combustion chamber axis and a center axis of the collector passageway.

12. The intake port structure as recited in claim 1, wherein
the first and second branching passageways include a cross-sectional area adjustment portion configured and arranged to constrict an overall cross sectional area of the first and second branching passageways such that the overall cross-sectional area of the first and second branching passageways is substantially equal to a cross-sectional area of the collector passageway.

13. The intake port structure as recited in claim 10, wherein
the first and second branching passageways include a cross-sectional area adjustment portion configured and arranged to constrict an overall cross sectional area of the first and second branching passageways such that the overall cross-sectional area of the first and second branching passageways is substantially equal to a cross-sectional area of the collector passageway.

14. The intake port structure as recited in claim 1, wherein
the fuel injector is disposed in the collector passageway such that a center axis of the fuel injector is disposed in a plane including the combustion chamber axis and a center axis of the collector passageway.

15. The intake port structure as recited in claim 10, wherein
the fuel injector is disposed in the collector passageway such that a center axis of the fuel injector is disposed in a plane including the combustion chamber axis and a center axis of the collector passageway.

16. The intake port structure as recited in claim 1, wherein
the fuel injector includes a two-way fuel injection valve configured and arranged to inject fuel in two paths from the collector passageway toward the first and second branching passageways.

17. The intake port structure as recited in claim 10, wherein
the fuel injector includes a two-way fuel injection valve configured and arranged to inject fuel in two paths from the collector passageway toward the first and second branching passageways.

18. The intake port structure as recited in claim 1, wherein
the fuel injector is arranged in the collector passageway of the intake air passage to inject a fuel stream towards the first and second branching passageways.

19. An intake port structure for an internal combustion engine comprising:
intake air introducing means for introducing intake air in an upstream section of the intake port structure;
intake air branching means for dividing intake air flowing from the intake air introducing means into two branches to introduce the intake air to a cylinder via first and second intake valves;
fuel injecting means for injecting a fuel spray toward the intake air branching means; and
intake air flow impact means for laterally dispersing a portion of the intake air flowing from the intake air introducing means into the intake air branching means at areas encompassed by imaginary tubes projected from first and second intake valve openings in a direction parallel to a center combustion chamber axis with a downstream edge of the intake air flow impact means disposed downstream of upstream edges of the imaginary tubes with respect to the intake air flowing in the intake air introducing means.

* * * * *